(12) United States Patent
Xu

(10) Patent No.: US 10,376,719 B1
(45) Date of Patent: Aug. 13, 2019

(54) VEHICLE-MOUNTED MULTIFUNCTIONAL TOOL

(71) Applicant: Ye Xu, Sugar Land, TX (US)

(72) Inventor: Ye Xu, Sugar Land, TX (US)

( * ) Notice: Subject to any disclaimer, the term of this patent is extended or adjusted under 35 U.S.C. 154(b) by 0 days.

(21) Appl. No.: 16/029,233

(22) Filed: Jul. 6, 2018

(30) Foreign Application Priority Data

May 11, 2018 (CN) .................... 2018 2 0699706 U

(51) Int. Cl.
*A62B 3/00* (2006.01)
*B25F 1/00* (2006.01)
*B26B 11/00* (2006.01)
*B60R 11/06* (2006.01)
*B60R 22/32* (2006.01)
*B60R 11/00* (2006.01)
*B60R 11/02* (2006.01)

(52) U.S. Cl.
CPC .............. *A62B 3/005* (2013.01); *B25F 1/006* (2013.01); *B26B 11/00* (2013.01); *B60R 11/06* (2013.01); *B60R 22/32* (2013.01); *B60R 11/0241* (2013.01); *B60R 2011/0008* (2013.01); *B60R 2022/328* (2013.01)

(58) Field of Classification Search
CPC ......... B25F 1/006; A62B 3/005; B26B 11/00; B60R 11/06; B60R 11/0241; B60R 22/32; B60R 2011/0008; B60R 2022/328; B25D 2250/271
See application file for complete search history.

(56) References Cited

U.S. PATENT DOCUMENTS

| 7,557,720 | B2 * | 7/2009 | Rubin | ................... A62B 3/005 340/321 |
| 8,146,192 | B2 * | 4/2012 | McGlynn | ............... A62B 3/005 224/162 |
| 9,080,714 | B2 * | 7/2015 | Minn | ................. B60R 11/0241 |
| 9,254,560 | B2 * | 2/2016 | Rubin | ..................... B25F 1/006 |
| 9,403,466 | B1 * | 8/2016 | Deng | .................... B60N 3/023 |
| 9,533,611 | B2 * | 1/2017 | Deng | .................... B60N 3/023 |
| 9,716,359 | B1 * | 7/2017 | Xu | ......................... B25F 1/006 |
| 9,718,412 | B2 * | 8/2017 | Minn | ................. B60R 11/0241 |
| 9,814,912 | B2 * | 11/2017 | Sun | ........................ A62B 3/005 |
| 9,849,311 | B2 * | 12/2017 | Sun | ........................ A62B 3/005 |
| 9,975,497 | B2 * | 5/2018 | Kim | ................... B60R 11/0241 |
| 2015/0033477 | A1 * | 2/2015 | Rubin | ..................... B25D 5/02 7/158 |
| 2016/0105046 | A1 * | 4/2016 | Chen | ........................ A62B 3/00 320/107 |
| 2017/0035172 | A1 * | 2/2017 | Kim | .................... A45C 13/1069 |
| 2017/0138587 | A1 * | 5/2017 | Lu | ......................... F21V 31/005 |
| 2017/0170858 | A1 * | 6/2017 | Tiller | ................... H04B 1/3877 |
| 2018/0008845 | A1 * | 1/2018 | Xu | ........................... B25F 1/04 |

* cited by examiner

*Primary Examiner* — David B. Thomas
(74) *Attorney, Agent, or Firm* — Benjamin Aaron Adler

(57) ABSTRACT

Provided here is a multifunctional tool functioning as a mobile device holder, a safety hammer and a cutter for use in a car. Generally, the multifunctional tool body has a top cover containing magnet(s), a bottom cover, a striking assembly with a striking mechanism disposed between the top and bottom covers, a blade disposed on the outer surface of the body and a clip disposed on the bottom cover. The multifunctional tool is secured to a vehicle vent and can is used to break window glass and/or cut a seat belt in an emergency and to magnetically secure a mobile device for easy accessibility.

14 Claims, 9 Drawing Sheets

VEHICLE-MOUNTED MULTIFUNCTIONAL TOOL

CROSS-REFERENCE TO RELATED APPLICATION

This non-provisional application claims benefit of priority under 35 U.S.C. § 119(a) of Chinese Application No. 201820699706.5, filed May 11, 2018, the entirety of which is hereby incorporated by reference.

BACKGROUND OF THE INVENTION

Field of the Invention

The present invention generally relates to the technical field of vehicle accessories. More specifically, the present invention relates to a multipurpose tool, which may be mounted within a cabin of a vehicle.

Description of the Related Art

Currently, safety equipment, e.g., safety hammers capable of breaking a vehicle's window are commonly installed on vehicles, such as busses, which carry a large number of passengers for use in emergency situations. Smaller vehicles including cars do not have pre-installed safety hammers. Consequently, car owners would need to separately purchase safety hammers, which are usually placed in the car's tool box, storage box or similar locations.

Unfortunately, not having appropriate safety equipment within arm's reach inside a vehicle is a disadvantage if it is difficult to quickly pick up the safety equipment and use it in case of a life-threatening emergency. Furthermore, proper functioning of a safety hammer is compromised if the tool is not correctly positioned to strike and break the window. Moreover, existing vehicle-mounted safety hammers are inconvenient to use and have a low impact force, leading to uncertainties in their effectiveness in emergency situations. This may be problematic especially for people with limited strength.

Therefore, there is a recognized need in the art for a user-friendly car safety equipment capable of delivering predictable impact force sufficient to break the windows and cut the seat belts of a vehicle. Particularly, the previous art is deficient in this aspect. The present invention fulfills this long-standing need and desire in the art.

SUMMARY OF THE INVENTION

The present invention is directed to a multifunctional device. The device comprises a body and a blade secured to the body. The body comprises a top cover, a bottom cover and a striking assembly. The top cover has a substantially flat top portion and a bottom portion and the bottom cover has a bottom portion and an open top portion. The bottom cover is secured to the top cover such that a first cavity is formed therebetween. The striking assembly is disposed within the first cavity. The present invention is directed to a related multifunctional device that further comprises a clip disposed on the bottom portion of the bottom cover.

The present invention also is directed to a multifunctional tool functioning as a safety hammer, a cutter, and a mobile device holder. The multifunctional tool comprises a top cover, a bottom cover, a striking assembly, a blade, and a clip. that has a substantially flat top portion for attachment to a mobile device and a bottom portion. The top cover has a substantially flat top portion configured for attachment of a mobile device and a bottom portion that comprises a plurality of recesses disposed thereon that are configured to receive a plurality of magnets. The bottom cover has a bottom portion and an open top portion with the bottom cover secured to the top cover such that a first cavity is formed therebetween. The striking assembly is disposed within the first cavity and is configured to break a window in the vehicle. The blade is disposed an outer surface of the multifunctional tool and is configured to cut a seat belt in the vehicle. The clip is disposed on the bottom surface of the bottom cover configured for removable attachment of the multifunctional tool to a surface. The present invention is directed to a related multifunctional device that further comprises a hook-shaped structure formed on an outer surface of the multifunctional tool where the blade is secured therein.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be by reference to certain embodiments thereof that are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF THE INVENTION

Figure 1:
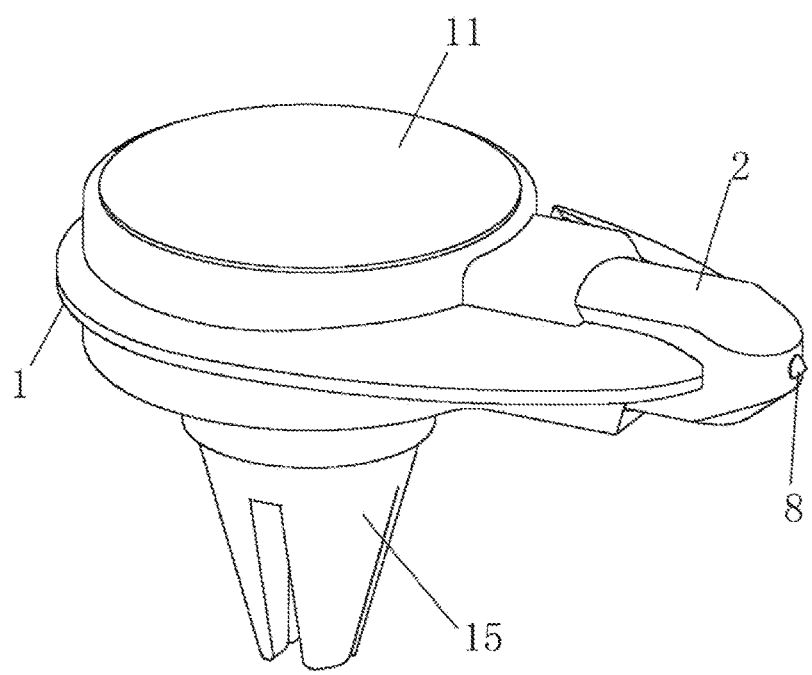
FIG. 1 is a perspective front to back left-side view of the multifunctional tool.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the term "proximal" refers to the end of the device that is nearer to the striking tip. Similarly, the term "distal" refers to the end of the device that is farther away from the striking tip.

In one embodiment of the present invention, there is provided a multifunctional device comprising a body, and a blade attached to the body. The body comprises a top cover, a bottom cover and a striking assembly.

In this embodiment, the top cover is provided with a top portion that is substantially flat and a bottom portion. A mobile device may be removably attached to the substantially flat top portion of the top cover.

Also in this embodiment, the attachment may be by any suitable removable attachment means, including, but is not limited to, a removable clip, VELCRO and a magnetic element. In one aspect, the removable attachment is a magnetic element attached to the top portion of the top cover, which magnetically attaches to a magnetized back surface of a mobile device case that is secured around the mobile device.

In another aspect of the attachment means, a second cavity is formed between the flat top portion and the bottom portion of the top cover. At least one magnet is disposed in the second cavity. In a preferred aspect of this embodiment, the bottom portion of the top cover comprises a plurality of recesses configured to receive a plurality of magnets by which a magnetized back surface of a mobile device case is attached.

In addition in this embodiment, mobile devices that may be attached to the top cover include, but are not limited to, a smart phone, a tablet, a computer, a communications device, an emergency management device, a medical device, a music player, a video player, a video recorder, a radar detector or a global positioning system (GPS) device.

Furthermore, in this embodiment, the bottom cover is provided with a open top portion and a bottom portion such that when the bottom cover is secured to the top cover a first cavity is formed between the top and bottom covers. A clip is disposed on the bottom portion of the bottom cover for removable attachment of the multifunctional device to a surface.

In one aspect, the removable attachment means on the bottom cover is a vent clip configured to removably attach the multifunctional device to a vent in a vehicle.

Furthermore, the body is provided on an inner wall at the proximal end, with a guide groove and an anti-disengagement chuck that are complementary in configuration with a guide rib and a pull-off prevention first flange on an outer surface of the striking assembly. This allows securing the striking assembly within the first cavity.

Further still, there is provided a striking assembly that helps break a glass in the vehicle for an occupant to escape in case of an emergency. The striking assembly is oriented in a plane perpendicular to the longitudinal axis of the body. The striking assembly is disposed within the first cavity. The striking assembly is provided with a guide rib and a pull-off prevention first flange on an outer surface that engages the complementary guide groove and the complementary anti-disengagement chuck provided on the inner wall of the body. The striking assembly encloses a striking mechanism that comprises a hollow sliding holder, a striking tip, a floating spring, a striking head, a striking spring, a stopper and an alignment member. In this embodiment, the sliding holder comprises an opening at a bottom surface disposed around the alignment member.

In one aspect of this embodiment, the sliding holder is substantially cylindrical and is provided with a second axial opening at a proximal end. A striking tip having a second flange is integrally attached to the second axial opening in the sliding holder, whereby the second flange secures the striking tip to the proximal end of the sliding holder. In this embodiment, the striking tip has a proximal end that is substantially cone-shaped and a distal end that is substantially flat in a plane perpendicular to the longitudinal axis of the sliding holder (that is, in a plane parallel to the second flange). In an alternate configuration, the sliding holder is substantially cylindrical, and the striking tip has a substantially conical proximal end and a hollow cylindrical opening at a distal end is disposed at a proximal end of the sliding holder. The hollow cylindrical opening in the striking tip has an internal diameter sufficiently larger than the outer diameter of the sliding holder, so that the proximal end of striking holder is disposed within the hollow cylindrical opening in the striking tip. The floating spring is disposed against a back surface, in the opening of the holder.

Further still, the striking mechanism comprises a striking head. The striking head comprises a rod-shaped body with substantially flat proximal and distal ends. A ring-shaped shoulder is formed at the proximal end of the striking head such that, the diameter of the ring-shaped shoulder is substantially the same as the diameter of the second axial opening of the sliding holder. A third flange is formed at an end distal from the striking head. Thus, in a resting configuration (when the striking spring is not released), a transition gap is disposed between a front side of the opening of the sliding holder and the shoulder of the striking head.

Further still, a front surface of the shoulder is against a side of the opening at the bottom of the sliding holder when the striking spring is not released. In this embodiment, the striking spring is disposed between a back surface of the ring-shaped shoulder and a distal end of the striking head.

Further still, a stopper is provided at the back end of the second axial opening and is juxtaposed with the striking spring. In one aspect of this embodiment, the stopper tilts forward to push the striking spring and striking head downwards.

Further still in this embodiment, the alignment member is disposed directly under the striking head and formed on an inner surface of the sliding holder. The alignment member comprises a guide ramp, which is in contact with a back surface of the ring-shaped shoulder of the striking head and is configured to lift the striking head and to align the striking head along the longitudinal axis of the sliding holder and the striking tip.

In another embodiment of the present invention, there is provided a multifunctional tool functioning as a safety hammer, a cutter and a mobile device holder for use in a vehicle comprising a body and a blade attached to the body. The body comprises a top cover, a bottom cover and a striking assembly.

In this embodiment, the top cover has substantially flat top portion configured for attachment of a mobile device and a bottom portion, which comprises a plurality of recesses configured to receive a plurality of magnets. for attaching a mobile device. A magnetized back surface of a mobile device case may be removably attached to the substantially flat top portion of the top cover. Examples of a mobile device that may be attached to the top cover include, but is not limited to, a smart phone, a tablet, a computer, a communications device, an emergency management device, a medical device, a music player, a video player, a video recorder, a radar detector or a global positioning system (GPS) device.

In this embodiment, the bottom cover is provided with a bottom portion and an open top portion. The bottom portion of the bottom cover when secured to the top cover, forms a first cavity between the top cover and the bottom cover. The bottom portion of the bottom cover comprises a clip configured for removable attachment of the multifunctional tool to an inside surface of a vehicle.

In one aspect of this embodiment, the removable attachment on the bottom cover is a vent clip that permits removably attachment of the multifunctional tool to vents in a vehicle.

In this embodiment, there is provided a striking assembly configured to break a glass in the vehicle for an occupant to escape in case of an emergency. The striking assembly is oriented in a plane perpendicular to the longitudinal axis of the body and is disposed within the first cavity.

In one aspect of this embodiment, the striking assembly is provided with a guide rib and a pull-off prevention first flange on an outer surface that engages a complementary guide groove and a complementary anti-disengagement chuck provided on an inner wall of the assembled top and bottom covers. The striking assembly encloses a striking mechanism that comprises a hollow sliding holder, a striking tip, a floating spring, a striking head, a striking spring, a stopper and an alignment member. In this embodiment, the sliding holder comprises an opening at a bottom surface disposed around the alignment member.

In one aspect of this embodiment, the sliding holder is substantially cylindrical and is provided with a second axial opening at a proximal end. A striking tip having a second flange is integrally attached to the second axial opening in the sliding holder, whereby the second flange secures the striking tip to the proximal end of the sliding holder. In this embodiment, the striking tip has a proximal end that is substantially cone-shaped and a distal end that is substantially flat in a plane perpendicular to the longitudinal axis of the sliding holder (that is, in a plane parallel to the second flange). In an alternate configuration, the sliding holder is substantially cylindrical, and the striking tip has a substantially conical proximal end and a hollow cylindrical opening at a distal end is disposed at a proximal end of the sliding holder. The hollow cylindrical opening in the striking tip has an internal diameter sufficiently larger than the outer diameter of the sliding holder, so that the proximal end of striking holder is disposed within the hollow cylindrical opening in the striking tip. The floating spring is disposed against a back surface, in the opening of the holder.

Also in this embodiment, the striking mechanism comprises a striking head. The striking head comprises a rod-shaped body with substantially flat proximal and distal ends. A ring-shaped shoulder is formed at the proximal end of the striking head such that, the diameter of the ring-shaped shoulder is substantially the same as the diameter of the second axial opening of the sliding holder. A third flange is formed at an end distal from the striking head. Thus, when in a non-firing configuration (when the striking spring is not released), a transition gap is disposed between a front side of the opening of the sliding holder and the shoulder of the striking head.

In addition, in this embodiment, a front surface of the shoulder is against a side of the opening at the bottom of the sliding holder when the striking spring is not released. In this embodiment, the striking spring is disposed between a back surface of the ring-shaped shoulder and a distal end of the striking head. A stopper is provided at the back end of the second axial opening and is juxtaposed with the striking spring. In one aspect of this embodiment, the stopper tilts forward to push the striking spring and striking head downwards.

Furthermore, in this embodiment, the alignment member is disposed directly under the striking head and formed on an inner surface of the sliding holder. The alignment member comprises a guide ramp, which is in contact with a back surface of the ring-shaped shoulder of the striking head and is configured to lift the striking head and to align the striking head along the longitudinal axis of the sliding holder and the striking tip.

Provided herein are multifunctional tools that function as both a mobile device holder and as a safety tool comprising a car safety hammer and a seat belt cutter. The multifunctional tools have the advantages of a simple structure, convenient assembly and safe use. The tool has a striking assembly with a striker that functions as a window glass breaker and a blade or knife to cut a seat belt to enable escape from a vehicle in case of an emergency. The multifunctional tool has a clip-like attachment means that is configured for easy, removable clipping of the tool onto an interior vent in a vehicle and a magnetic component to which various mobile devices, for example, but not limited to, a smart phone or tablet or GPS device, which are modified with a magnetic attachment means or are disposed in a case with a magnetic attachment means, can be removably secured to the tool. Such arrangement keeps both the multifunctional tool and the attached device within easy reach of the driver or front seat passenger. While the multifunctional tool is designed for attachment within a vehicle, this doesn't preclude one from using the striker when outside the vehicle.

Particularly, embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 depicts a front to back perspective left-side view of the multifunctional tool showing the body 1, a top portion 11 of the top cover and a vent clip 15. Also shown is an alternate striking tip configuration 8 which is integrally fitted into the second axial opening in the sliding holder 2.

Figure 2:
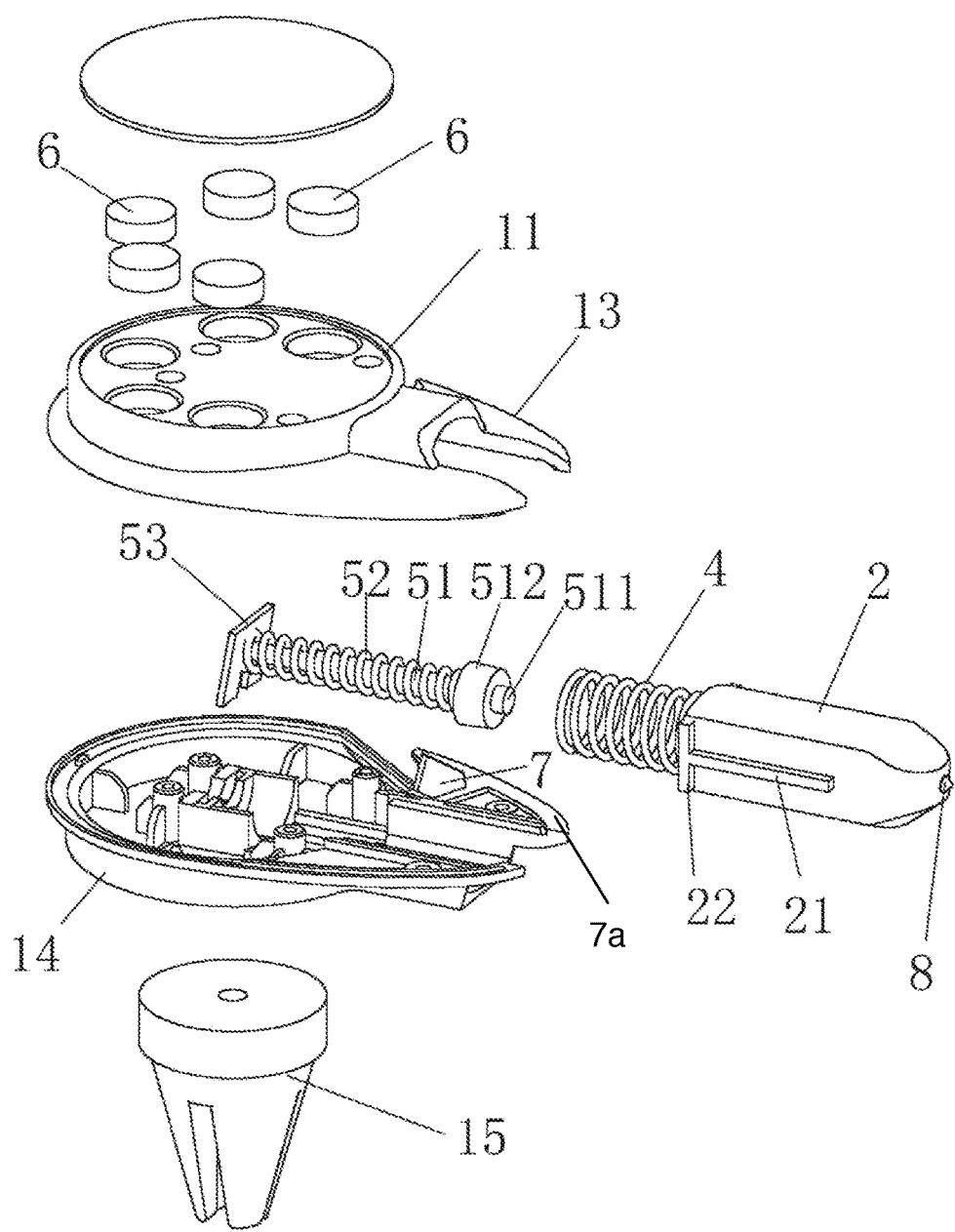
FIG. 2 is a fully exploded view of the multifunctional tool shown in FIG. 1 showing the top cover with the plurality of magnets, the bottom cover, a vent clip, and the striking mechanism disposed in a space between the top cover and the bottom cover.

With continued reference to FIG. 1, FIG. 2 shows a fully exploded view of the multifunctional tool. An exploded top cover 13 is depicted showing a plurality of magnets 6 in a second cavity inside the top portion 11 of the top cover. Also shown is an exploded view of the striking assembly comprising the sliding holder 2, striking tip 8, guide rib 21, a pull-off prevention flange 22, floating spring 4, a striking head 51 that has a ring-shaped shoulder 512, distal to the proximal end 511 of the striking head, striking spring 52, which is axially disposed around the striking head and a stopper 53, disposed at a back end against the striking spring. Further shown is a blade 7 disposed on an inner surface of the hook-shaped structure 7a in the bottom cover 14 of the body.

Figure 3:
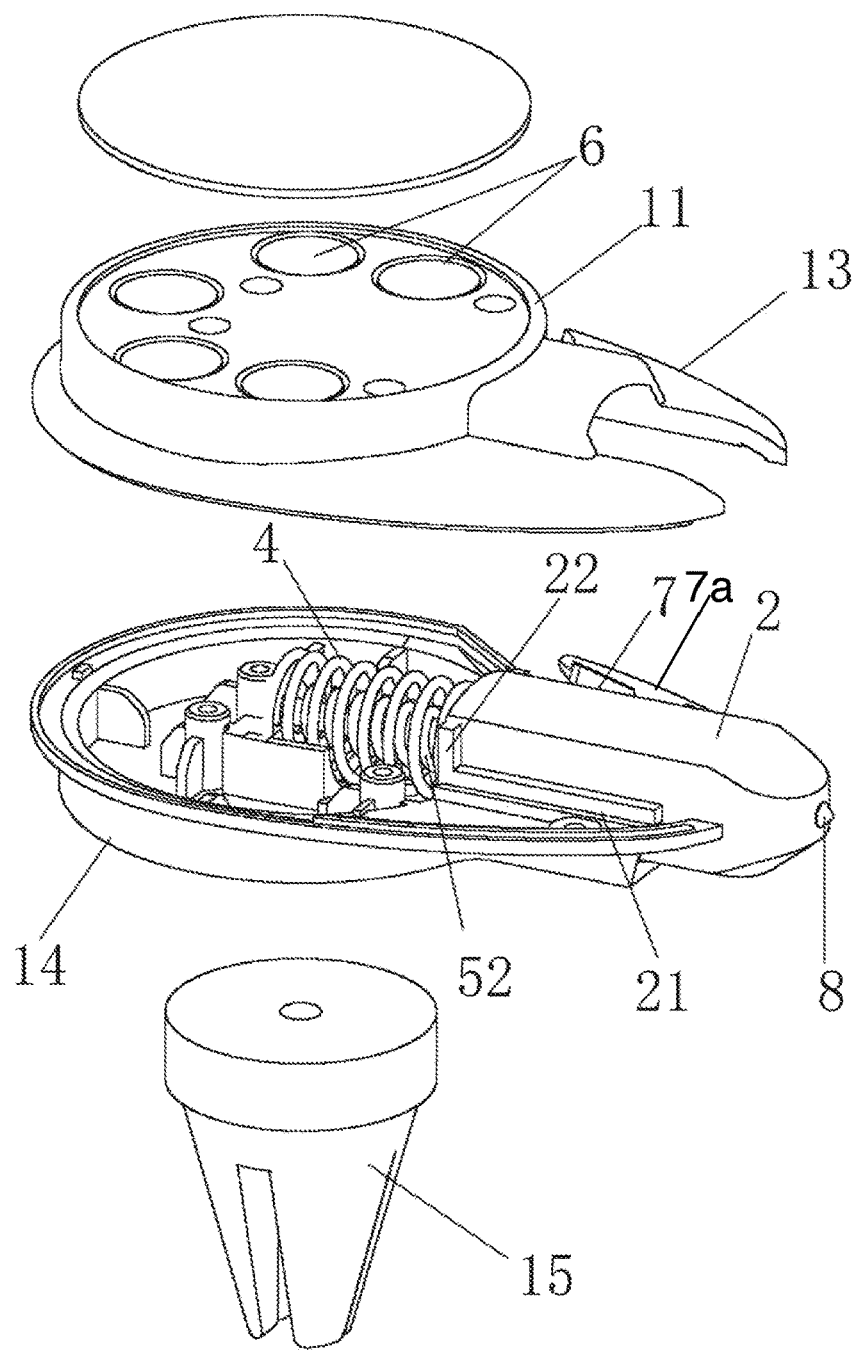
FIG. 3 is an exploded view of the multifunctional tool shown in FIG. 1 showing the top cover in which is assembled the plurality of magnets, the bottom cover in which is assembled the striking assembly comprising the striking mechanism shown in FIG. 2 and a vent clip.

With continued reference to FIG. 2, FIG. 3 shows a partially exploded view of the multifunctional tool wherein the magnets 6 are inside the top portion 11 on the top cover 13. Also shown is the striking assembly comprising the sliding holder 2, striking tip 8, guide rib 21, a pull-off prevention flange 22, floating spring 4, striking spring 52 and blade 7, in the first cavity formed between the top cover and the bottom cover 14.

Figure 4:
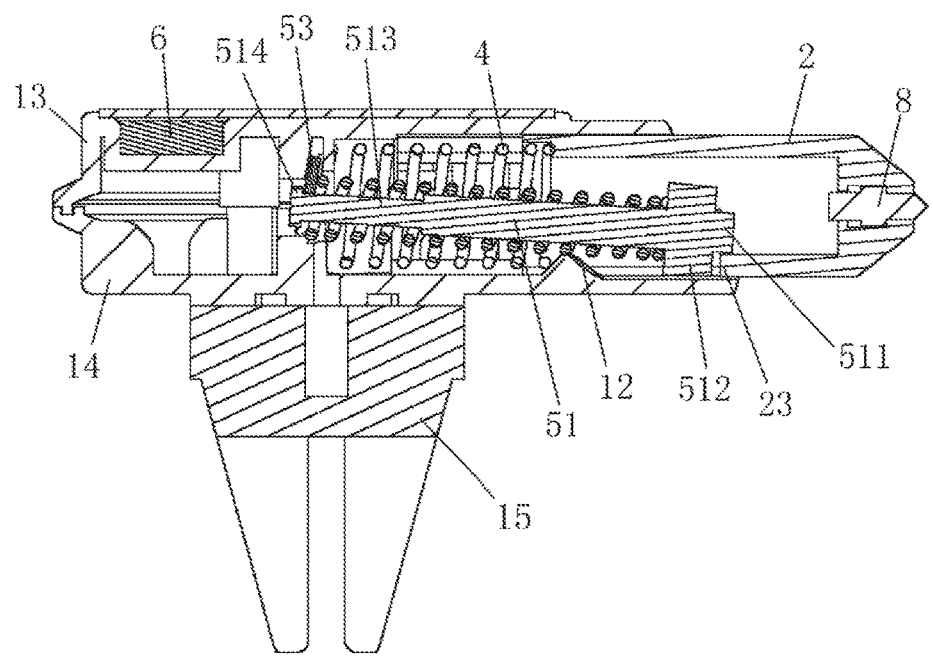
FIG. 4 is a sectional side view of the multifunctional tool, showing the inner structure of the striking mechanism in the resting configuration.

FIG. 4 shows a sectional side view of the multifunctional tool, showing the inner structure of the striking mechanism in the resting configuration. FIG. 4 illustrates that the striking head 51 comprises a substantially rod-shaped body, a shoulder 512 disposed distal to the proximal end 511 of the striking head, a striking spring 52 is disposed around the striking head with a proximal end abutting the back surface of the shoulder and a distal end abutting a proximal surface of stopper 53 that is disposed at the back end of the second axial opening against the striking spring. A third flange 514 with a diameter greater than that of the striking spring is formed at the distal end of the rod-shaped body of the striking head and is disposed through the stopper where a proximal surface of the flange abuts a distal surface of the stopper, such that the flange can limit the range of motion for the striking head. When the striking head is in motion, the shoulder 512 moves forward against the front surface of the proximal end of the sliding holder to further control the range of the motion of the striking head. When the striking tip is not in striking mode, the proximal end 511 of the striking head stays below the striking tip and the sliding holder is pushed back, pressing against the striking spring 52.

An alignment member 12 comprising a guide ramp is disposed directly under the striking head through an opening on the bottom surface of the sliding holder. A transition gap is disposed between the front side of the opening 22 and the shoulder 512 of the striking head to avoid the misfiring of the safety hammer. The striking spring 52 is disposed around the striking head. The stopper 53 tilts forwardly in an angle such that the striking head is pushed downwardly, keeping the proximal end 511 of the striking head off from the striking tip when it is not triggered.

Figure 5:
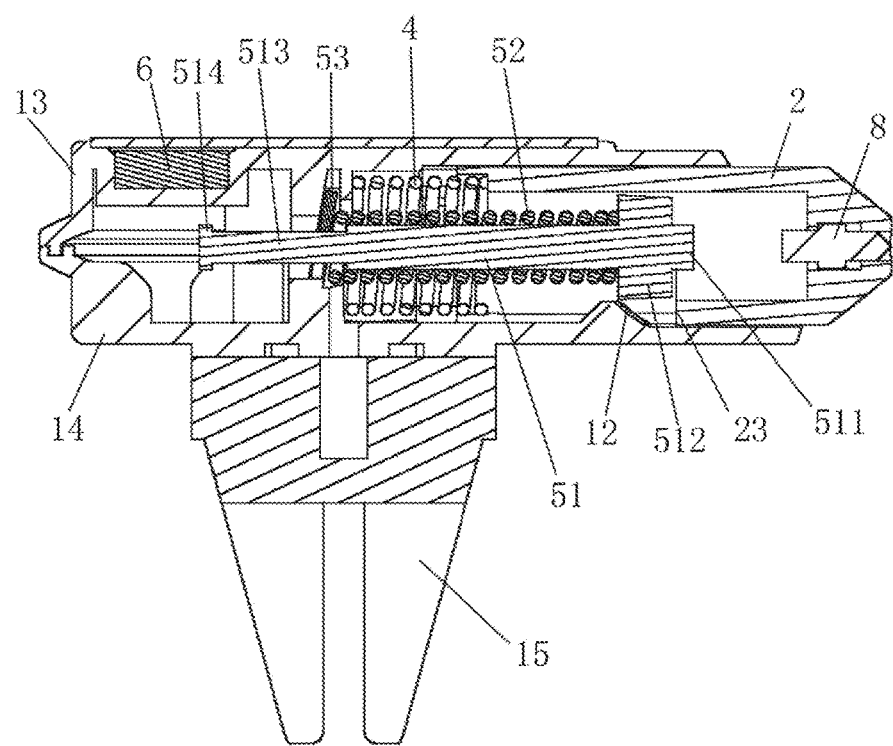
FIG. 5 is a sectional side view of the multifunctional tool, showing the coaxial alignment member aligning the striking head with the distal end of the striking member.

With continued reference to FIG. 4, FIG. 5 depicts the front side of the opening 23 at the bottom of the sliding holder in contact with the shoulder 512 of the striking head. The alignment member 12 is configured to lift the shoulder 512 of the striking member. The diameter of the shoulder 512 is substantially the same as the inner diameter of the sliding holder 2, ensuring that the striking member is consistently and accurately aligned with the striking tip when the alignment member is triggered.

Figure 6:
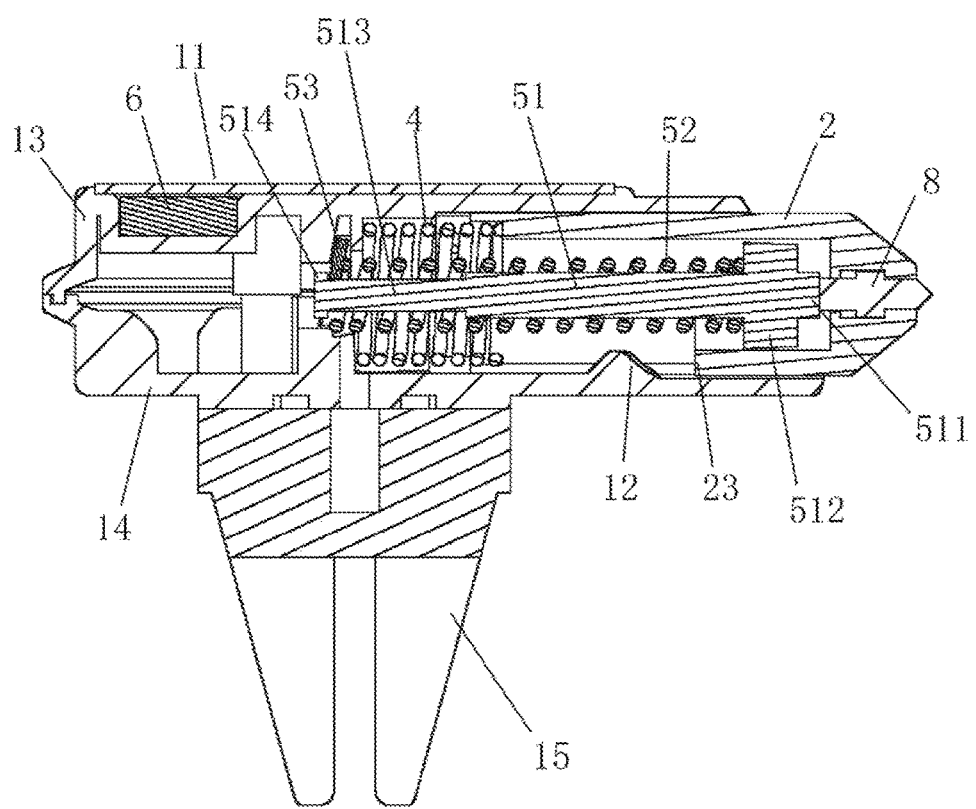
FIG. 6 is a sectional side view of the multifunctional tool, showing the proximal end of the aligned striking head in contact with the distal end of the striking member to complete the striking on an object.

With continued reference to FIGS. 4 and 5, FIG. 6 depicts the configuration of the device when the proximal end of the sliding holder 2 is pressed against a target (window), resulting in the holder 2 retracting toward the inside of the striking assembly. Consequently, the shoulder 512 of the striking head that is trapped in the opening 23 at the bottom of the holder is pushed backwards and pressed against the striking spring 52. At the same time the alignment member 12 guides the shoulder 512 upwards to align the striking head with a back surface of the striking tip 8 while the shoulder 512 is lifted up off the opening 23, resulting in the release of the striking spring 52, which propels the striking head to strike the striking tip, the force of the impact is transferred through the proximal cone shaped end of the striking tip to the window, thereby breaking the window.

Figure 7:
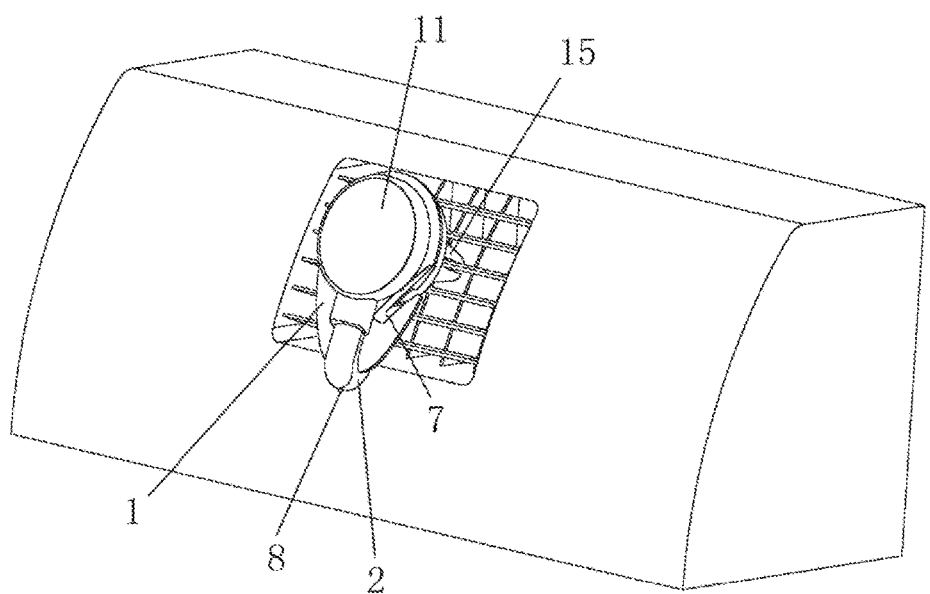
FIG. 7 illustrates attachment of the multifunctional tool to the air conditioning vent in the vehicle cabin by the vent clip.

FIG. 7 illustrates attachment of the multifunctional tool to an air conditioning vent using vent clip 15.

Figure 8:
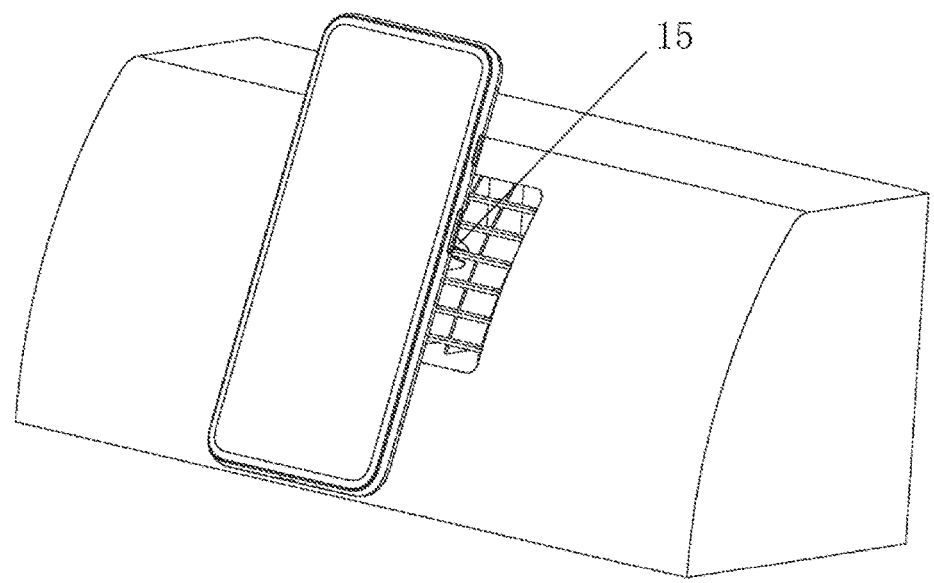
FIG. 8 illustrates attachment of a back surface of a mobile device to the top cover of the multifunctional tool shown in FIG. 7.

With continued reference to FIG. 7, FIG. 8 illustrates attachment of a mobile phone to the top portion 11 on the top cover of the multifunctional tool which is secured to an air conditioning vent using vent clip 15.

Figure 9:
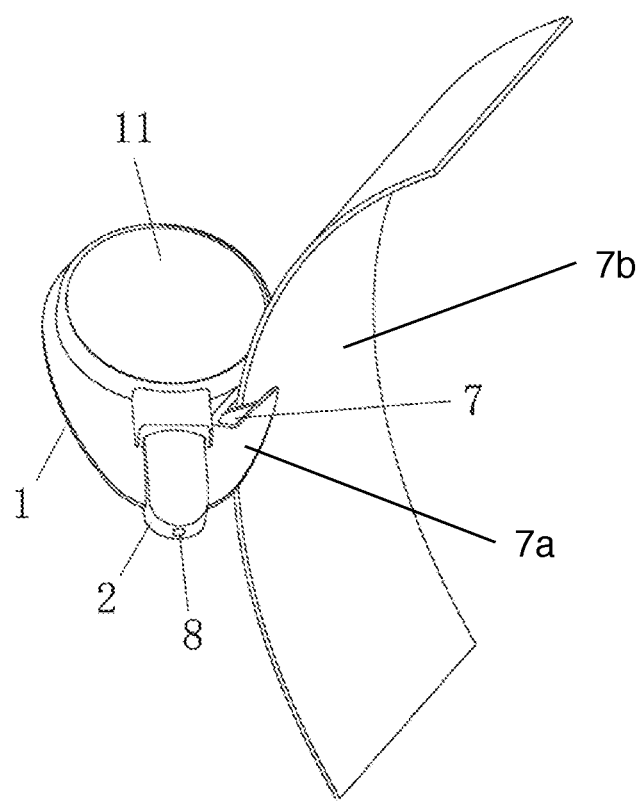
FIG. 9 illustrates how the multifunctional tool is used to cut a seat belt.

FIG. 9 illustrates use of the blade 7 in the multifunctional tool. The external hook-like structure 7a is shaped to receive a seat belt 7b or other straps or objects therein to contact the blade disposed in the inner surface of the hook. The position of the blade enables the seat belt or other objects or straps to be cut to release a user or other individual trapped in a car in an emergency.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A multifunctional device comprising:
    a body comprising:
        a top cover with a substantially flat top portion and a bottom portion that form a second cavity therebetween, said top cover comprising at least one magnet disposed in said second cavity;
        a bottom cover with a bottom portion and an open top portion, said bottom cover secured to the top cover such that a first cavity is formed therebetween; and
        a striking assembly provided with a guide rib and a pull-off prevention first flange on an outer surface that engages a complementary guide groove and a complementary anti-disengagement chuck provided on an inner wall of the body and is disposed within the first cavity in a plane perpendicular to a longitudinal axis of the body and encloses a striking mechanism comprising:
            a substantially cylindrical sliding holder with a substantially circular second axial opening at a proximal end;
            a striking tip integrally attached by a second flange in the second axial opening at the proximal end of the sliding holder;
            a floating spring disposed against a back surface of the holder;
            a striking head with a substantially flat proximal end and a substantially flat distal end that has a ring-shaped shoulder formed at the proximal end and a third flange formed at the distal end thereof, whereby a transition gap is disposed between a front side of the opening of the sliding holder and the shoulder of the striking head;
            a striking spring disposed axially around said striking head between a back surface of the shoulder and the distal end of the striking head;
            a stopper disposed at a back end of the second axial opening against said striking spring; and
            an alignment member disposed directly under the striking head and formed on an inner surface of the holder, said alignment member comprising a guide ramp in contact with a back surface of the ring-shaped shoulder of the striking head configured to lift said striking head and to align the striking head along the longitudinal axis of the sliding holder and the striking tip; and a blade secured to the body.

2. The multifunctional device of claim 1, wherein a diameter of said ring-shaped shoulder is substantially the same as a diameter of the axial opening of the sliding holder.

3. The multifunctional device of claim 1, wherein a front surface of said shoulder is against a side of said opening at the bottom of the sliding holder when the striking spring is not released.

4. The multifunctional device of claim 1, wherein the stopper tilts forward to push said striking spring and striking head downwards.

5. The multifunctional device of claim 1, wherein the bottom portion of the top cover further comprises a plurality of recesses disposed thereon, said top cover further comprising a plurality of magnets disposed in said plurality of recesses.

6. The multifunctional device of claim 1, further comprising a clip disposed on the bottom portion of the bottom cover.

7. The multifunctional device of claim 1, wherein the body further comprises a hook-shaped structure formed on an outer surface thereof, said blade secured therein.

8. A multifunctional tool functioning as a safety hammer, a cutter, and a mobile device holder for use in a vehicle comprising:

a top cover with a substantially flat top portion configured for attachment of a mobile device and a bottom portion, said bottom portion comprising a plurality of recesses disposed thereon configured to receive a plurality of magnets;

a bottom cover with a bottom portion and an open top portion, said bottom cover secured to the top cover such that a first cavity is formed therebetween;

a striking assembly disposed within the first cavity configured to break a window in the vehicle;

a blade disposed on an outer surface of the multifunctional tool configured to cut a seat belt in the vehicle and a clip disposed on the bottom surface of the bottom cover configured for removable attachment of the multifunctional tool to a surface.

9. The multifunctional tool of claim 8, wherein the striking assembly is disposed in a plane perpendicular to a longitudinal axis of the body and encloses a striking mechanism comprising:

a substantially cylindrical sliding holder with a substantially circular axial opening at a proximal end;

a striking tip integrally attached by a second flange, in the axial opening at the proximal end of the sliding holder;

a floating spring disposed against a back surface of the holder;

a striking head with a substantially cone-shaped proximal end and a substantially flat distal end, having a ring-shaped shoulder formed at the proximal end, and a third flange formed at the distal end thereof, whereby a transition gap is disposed between a front side of the opening of the sliding holder and the shoulder of the striking head;

a striking spring disposed axially around said striking head between a back surface of the shoulder and the distal end of the striking head;

a stopper disposed at a back end of the axial opening against said striking spring; and an alignment member disposed directly under the striking head and formed on an inner surface of the holder, said alignment member comprising a guide ramp in contact with a back surface of the ring-shaped shoulder of the striking head configured to lift said striking head and to align the striking head along the longitudinal axis of the sliding holder and the striking tip.

10. The multifunctional tool of claim 9, wherein a diameter of said ring-shaped shoulder is substantially the same as a diameter of the axial opening of the sliding holder.

11. The multifunctional tool of claim 9, wherein a front surface of said shoulder is against a side of said opening at the bottom of the sliding holder when the striking spring is not released.

12. The multifunctional tool of claim 9, wherein the stopper tilts forward to push said striking spring and striking head downwards.

13. The multifunctional tool of claim 9, wherein the striking assembly is provided with a guide rib and a pull-off prevention first flange on an outer surface that engages a complementary guide groove and a complementary anti-disengagement chuck provided on an inner wall of the body.

14. The multifunctional tool of claim 8, further comprising a hook-shaped structure formed on an outer surface of the multifunctional tool, said blade secured therein.

* * * * *